Sept. 6, 1932. E. W. PAGE 1,876,431
FILM HOLDER
Filed Aug. 24, 1927
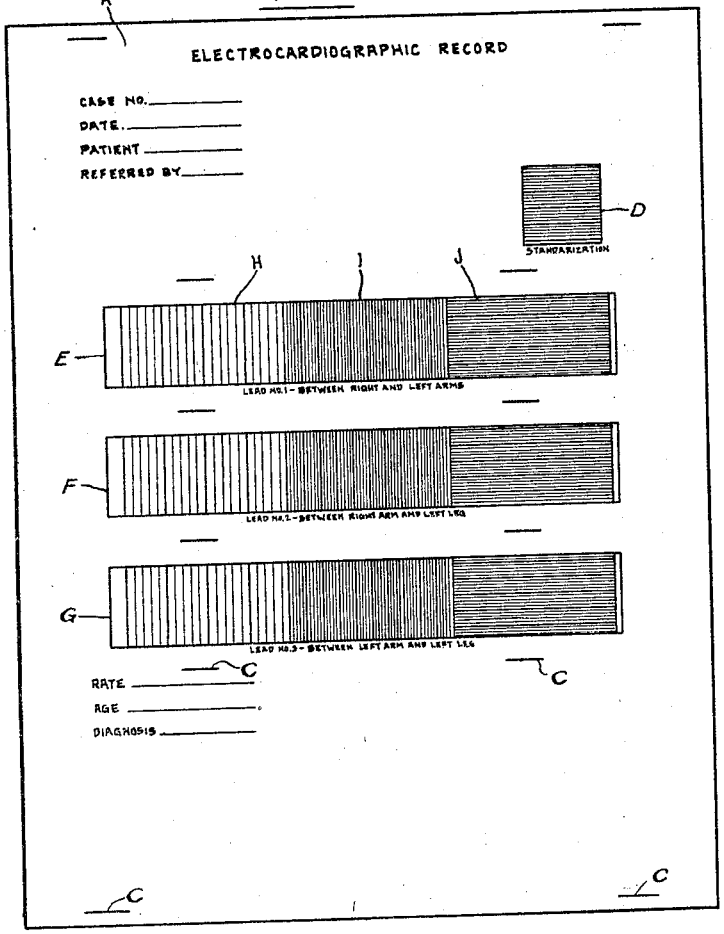
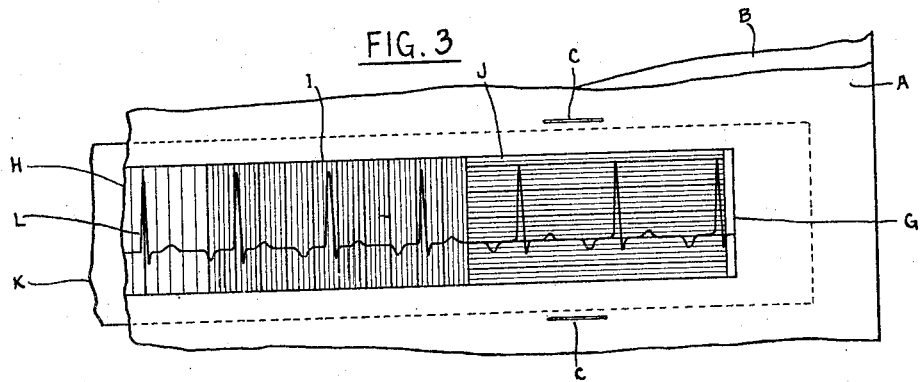
INVENTOR
EVERETT W. PAGE
BY *[signature]*
ATTORNEY Patented Sept. 6, 1932

1,876,431

UNITED STATES PATENT OFFICE

EVERETT W. PAGE, OF RIVER FOREST, ILLINOIS, ASSIGNOR TO GENERAL ELECTRIC X-RAY CORPORATION, OF CHICAGO, ILLINOIS, A CORPORATION OF NEW YORK

FILM HOLDER

Application filed August 24, 1927. Serial No. 215,094.

The present invention has to do with a means for holding a film produced by an electrocardiograph or by some other instrumentality and upon which a record is impressed or formed. The purpose of the invention is to provide means for rapid, accurate and convenient reading of the impressed information, while at the same time preserving the film record.

With the development of electrical or mechanical instrumentalities as recording means, and the application of electrical or mechanical means to such purposes or ancillary thereto, in combination with controlled light effects whereby the performance of an object or device is impressed upon a film or the equivalent in a permanent and readily visualized manner, it has been necessary to provide new and better means for the interpretation of such impressed records.

In the present instance, the invention will be described generally as associated with an electrocardiograph. Its application to other instrumentalities and mechanisms is at once apparent. There is no intention to limit the invention to the single recording instrumentality referred to in the specification which follows:

Included in the objects of the invention, are the following:

A new film holder better adapted to facilitate the interpretation of recorded light effects upon films or the like;

An improved holder for films depicting records of performance and in which the comparison of a plurality of records one with another and with a standard or unit is simplified;

The combination with a film holder of improved means for measuring a record impressed upon the film;

The combination with a film record of means for the comparison of such record with other film records and measuring data in association therewith;

The combination with a film of a holder having standardized or unit measurements whereby the film may be readily read;

The novel association of a film holder provided with standard units and which permits of a film record being adjusted with respect to such units whereby to facilitate rapid reading and close interpretation; and The combination of means for holding a plurality of films bearing recorded data in association with means for the ready interpretation of such data.

These, and such other objects as may hereinafter appear, are obtained by the novel construction, combination, and arrangement of the parts disclosed in the illustration of one form of the invention shown in the accompanying single sheet of drawing. In said sheet of drawing:

Figure 1 is a plan view of such embodiment;

Figure 2 is an end view thereof; and

Figure 3 is a fragmentary plan view showing a film in position in one of the film holding portions of the device.

Like reference characters are used to designate similar parts in the drawing and in the specification which follows.

It is worthy to note that there has been a tremendous development recently in the medical profession. In the technical arts a similar progress has occurred. With the aid of light and electricity, diagnoses and records heretofore accurately impossible by physicians are now readily being made. The limitation of mechanical records appears to be limited only by the accuracy and diversity of instruments which may be designed for the purpose and by the accuracy with which the impressions or data from such instrumentalities may be interpreted.

In the present instance, reference is had to an improved electrocardiograph. It has been usual and customary to provide upon an electrocardiograph film concurrently with the taking of the record, a gradation or unit measurement which forms a part of the picture impressed upon the film itself. In some instances, arrangements have been made whereby the film was first impressed with gradations or markings which became apparent upon the development of the film.

These methods have been inconvenient and fraught with inaccuracies, for it has been difficult to accurately read the recorded impressions upon the film unless by accident they fell exactly where desired by the reader and in the ideal relation to the units marked off on such films. The need for a means adapted to be associated with a film whereby the data impressed thereupon may be readily read in simple association or adjustable relation with the unit of comparison has been apparent for sometime. The present invention is believed to fully supply this need.

In the present invention, there is no necessity for impressing upon the strip of film any markings or any matter other than the data (line or lines) which is to be interpreted when the film has been developed. This simplifies the electrocardiograph or other recording instrumentality and the photographic apparatus in association therewith, and permits of the use of an unmarked strip of film, it being necessary only to provide for constant relative movement of such film strip in the recording instrument.

The device illustrated in Figures 1 and 2, comprises two sheets of material, A and B, adapted to be fastened together by brads, C, or otherwise. Such sheets, A and B, in combination with the brads, C, provide channels or grooves into which strips or portions of films may be inserted. Entrance to such slots or channels may be had from either side of the holder.

Windows are cut in sheet A, there being four windows in the present embodiment, designated D, E, F, G. The windows E, F, and G should be of sufficient width to permit of a reading of the complete vertical or transverse impression upon the film and should have a length admitting of a number of cycles of operation being shown; that is, the three longer windows, E, F, and G, should be so equipped that the recorded impression of several operations of the tested article, device or part are plainly visible. The window D, may be relatively short and show merely the deflection per unit or the standardization of the instrument. In order to be able to compare different records it is necessary to standardize the instrument for unit deflection of the galvanometer or a unit voltage impressed.

Usually each movement or deflection of the galvanometer above or below the base line on an electrocardiogram in standardization is representative of one millivolt of electricity for each centimeter of deflection.

Either printed upon the sheet B or printed upon an independent sheet inserted between A and B, and preferably secured to B, are a plurality of differently arranged lines which are representations of arbitrarily selected units. These lines in the present instance comprise three sections, H, I and J. Section H comprises spaced vertical lines for coarse reading; section I comprises vertical lines, every fifth line being heavier than the four intermediate lines, and arranged for finer reading, and section J comprises spaced horizontal lines, each fifth line being heavier than the four intermediate lines, the spacing being for accurate reading.

The spacing between units and the arrangements and character of the units and their proportion, one section with another, will depend upon the type of the work in store for the recording apparatus. In the present instance the lines disclosed are suitable for reading the impressions obtained by the generation of electrical currents as an incident to the expansion and contraction of the heart muscle through the agency of a modern and improved electrocardiograph.

There may be associated with the member A or with the member B, or both, printed words, figures and lines and/or marked-off spaces for the writing of data or the like, directly upon the film holder itself. As shown, the data selected comprises case number, date, name of patient, bookkeeping data, and the diagnosis or conclusion.

The particular photographic record which is to be read may be inserted in back of a selected or the proper one of the three longitudinal windows. In cardiographic work, it is customary to employ three records and therefore to label or print upon sheet A indicia showing from whence the particular record was obtained. In connection with a machine, the manner in which the particular record appearing in such window was obtained, or to what part or parts it relates, could be indicated.

In Figure 3 a portion of the device is shown, and in this a film K is inserted. Upon the film K is the impression L obtained in the electrocardiograph. The present illustration is that of amplified electrical currents generated in the heart fibres during expansion and contraction of the heart muscle, and the various lines and curves show graphically the characteristics of the said organ as divulged by such electrical activity.

By moving the film K about in association with the lines H, I, and J, so that the impression L may be read thereagainst, the characteristics of the heart currents recorded may be determined and its relation to a normal heart current compared, which normal heart current is generally well known to the clinician. As the film K is loosely mounted in the device, it may be moved about with respect to the indicia printed upon the backer B, or otherwise held in the device, so that the film K may be put into position most convenient for instant and accurate reading of graph L.

Variations in the photographic record L from the standard may be quickly seen. Measurements of the peculiarities or idiosyncrasies disclosed by the photographic record can be instantly had or determined. The possibilities for comparative reading and interpretation are unlimited.

The heart current pctures described are but one of many photographically recorded impressions which may be measured and read in a device of this character. Any number of other impressions may be examined in and filed away as permanent records in the device, the data thus obtained and preserved to be held for future reference, either for comparison, or for inspection.

The type of holder and the arrangement of the parts thereof may be modified to meet particular cases, the present form being suitable, as indicated above, for electrocardiograph records. For electrocardiograph records, other forms, of course, may be employed.

In the present form of the device, the distance from one end of the scales upon the three windows to the other end thereof is exactly six inches. This distance is based upon the normal movement of the film in the electrocardiograph.

The film movement in the type of electrocardiograph with which this is used is one inch in each second. The visible portion of the impressed image between end lines is for a six second period.

The heart beats per minute may readily be calculated by first noting the number of heart beats shown between the extremes upon the scales, a six second picture of its performance, and second by multiplying the number shown by ten, six seconds times ten being sixty seconds or one minute.

Other mathematical data regarding the performance of a heart may be readily calculated by reference to the constants just described.

Calculations, comparisons and examinations are readily had in view of the facility with which a film record may be moved toward or from the horizontal base line or toward or away from any other major or minor division shown upon the scale forming a part of the holder.

I claim:

1. A film holder comprising a front and a back, and fastening members therebetween, the front of said holder having a window of slightly less width than the width of the film to be held therein, that portion of the back exposed through said window bearing a series of spaced, transverse lines, and said fastening members being located on opposite sides of and spaced transversely of said window a distance slightly greater than the width of a film to be inserted into said holder and viewed through said window.

2. A film holder and record comprising a front having a window, a back having thereon spaced apart lines visible through said window, and fasteners above and below said window securing said front and back together and forming guides for film inserted into said holder and for directing such film across said lines.

3. A film holder and record comprising a front having a window, a back having thereon spaced apart lines visible through said window, and fasteners above and below said window securing said front and back together and forming guides for film inserted into said holder and for directing such film across said lines there being in said device an additional window to hold a section of film depicting the deflection under a standard voltage of the electrically controlled instrumentality used for producing a record upon the film or films to be inserted in said holder.

4. A film holder and record comprising a front for a window, a back having thereon spaced apart lines visible through said window, and fasteners intermediate said front and back and adjacent to said window, said fasteners guiding films held between said back and front for substantially straight line movement past said window, said fasteners being so spaced that a film when within said holders intermediate said fasteners and said front and back is transversely adjustable to said spaced apart lines.

5. A film holder and record comprising a front and back providing a plurality of parallel film holding sections, each of said sections having a plurality of spaced apart series of parallel lines, certain of said lines being normal to others, said film holding sections being adapted to guide a film inserted between said front and back across and in juxtaposition to, but with allowable relative movement with respect to said lines and being spaced apart a distance admitting of conjoint and ready comparison of the films therein.

EVERETT W. PAGE.